March 29, 1938.　　　C. H. PHELPS　　　2,112,574

APPARATUS FOR DETERMINING THE FREQUENCY OF ELECTRICAL CURRENTS

Filed Sept. 23, 1935　　　2 Sheets-Sheet 1

INVENTOR
Clyde H. Phelps
BY
Staley & Melch
ATTORNEYS

March 29, 1938.  C. H. PHELPS  2,112,574
APPARATUS FOR DETERMINING THE FREQUENCY OF ELECTRICAL CURRENTS
Filed Sept. 23, 1935  2 Sheets-Sheet 2
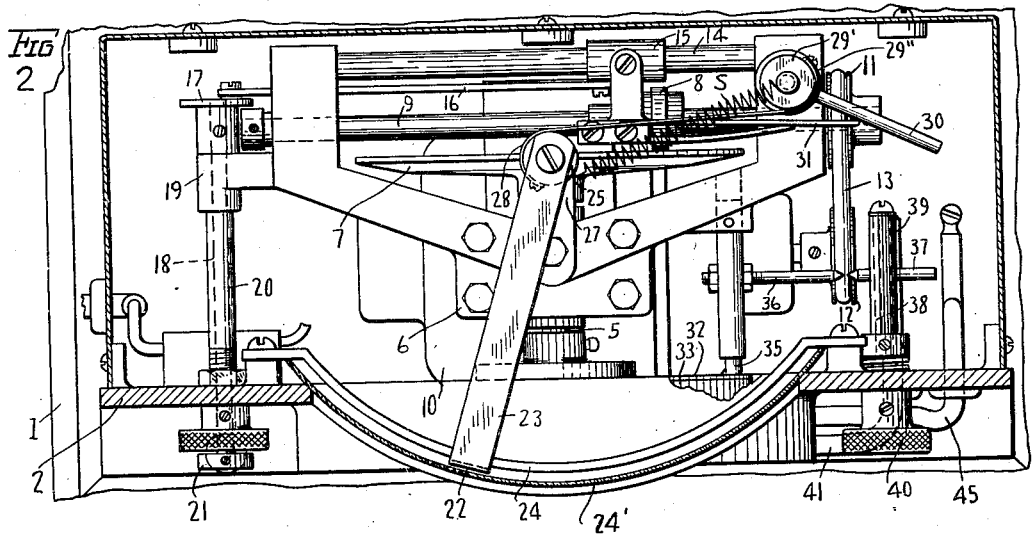
INVENTOR
Clyde H. Phelps
BY Staley + Welch
ATTORNEYS Patented Mar. 29, 1938

2,112,574

UNITED STATES PATENT OFFICE 2,112,574

APPARATUS FOR DETERMINING THE FREQUENCY OF ELECTRICAL CURRENTS

Clyde H. Phelps, Mount Vernon, N. Y., assignor to The Lantz Phelps Corporation, Dayton, Ohio, a corporation of Ohio Application September 23, 1935, Serial No. 41,755

5 Claims. (Cl. 175—183)

This invention relates more particularly to the apparatus for testing and indicating the condition of internal combustion engines, particularly those engines which are installed on automobiles, although the invention in its broadest aspect extends to an apparatus for measuring the frequency of any A. C. current or the interruption of any D. C. current.

The apparatus is particularly adapted to and capable of use by automobile mechanics to test the efficiency of the engine after an adjustment has been made therein in order to ascertain the increased or decreased efficiency of the engine by determining the increased or decreased speed of the engine under the same running conditions. To that end there is employed a rotatable luminous tube, preferably a gas-filled tube, such as a neon tube, which is energized from the ignition system of the internal combustion engine, together with means for rotating the tube, such as an electric motor, and means for varying the speed of rotation of the tube in order to synchronize it with the speed of the engine being tested. An electrical connection is made from the ignition system of the engine, preferably from the distributor, so that an electrical impulse is received by the tube upon the firing of each cylinder of the engine.

Before any adjustment is made to the engine, the mechanism which rotates the tube is synchronized with the speed of the engine by variable speed devices, the adjustment being so made that substantially stationary bands of light will appear, preferably one for each cylinder of the engine. After an adjustment to the engine has been made, such for instance as cleaning or replacing the spark plugs, if the speed of the engine has increased these bands of light will appear to rotate in a clockwise direction, whereas if the speed of the engine has decreased these bands of light will appear to rotate in an anti-clockwise direction. The variable speed devices are then manually adjusted to again synchronize the speed of rotation of the tube with the speed of the engine, and an indicator connected with the adjusting devices will indicate to the observer the increased or decreased speed of the engine.

If a six-cylinder engine is being tested, when the speed of rotation of the light tube is synchronized with the speed of the engine, six equally spaced bands of light will ordinarily and preferably appear to the observer, these bands of light being at fixed points, although if desired the speed of rotation of the light tube may be so adjusted that only three or a lesser number of bands of light will appear. If now the speed of the engine is increased by some favorable adjustment, the impulses received by the tube from the ignition system of the engine will be altered so that the effect is to make it appear that these six bands of light rotate in a clockwise direction until the speed of rotation of the light tube is again synchronized by increasing the speed of rotation so as to bring the bands of light to a substantially stationary position.

The object of the invention is to provide an apparatus for efficiently measuring the frequency of an alternating or interrupted D. C. current and particularly for measuring the frequency of the ignition system of a motor vehicle in order to test the efficiency of the engine of the vehicle after adjustment has been made therein.

In the accompanying drawings:

Fig. 2 is a transverse section on the line 2—2 of Fig. 1.

Fig. 3 is a vertical section on the line 3—3 of Fig. 1.

Fig. 4 is a transverse section of a detail, the section being on the line 4—4 of Fig. 3.

Figure 1:
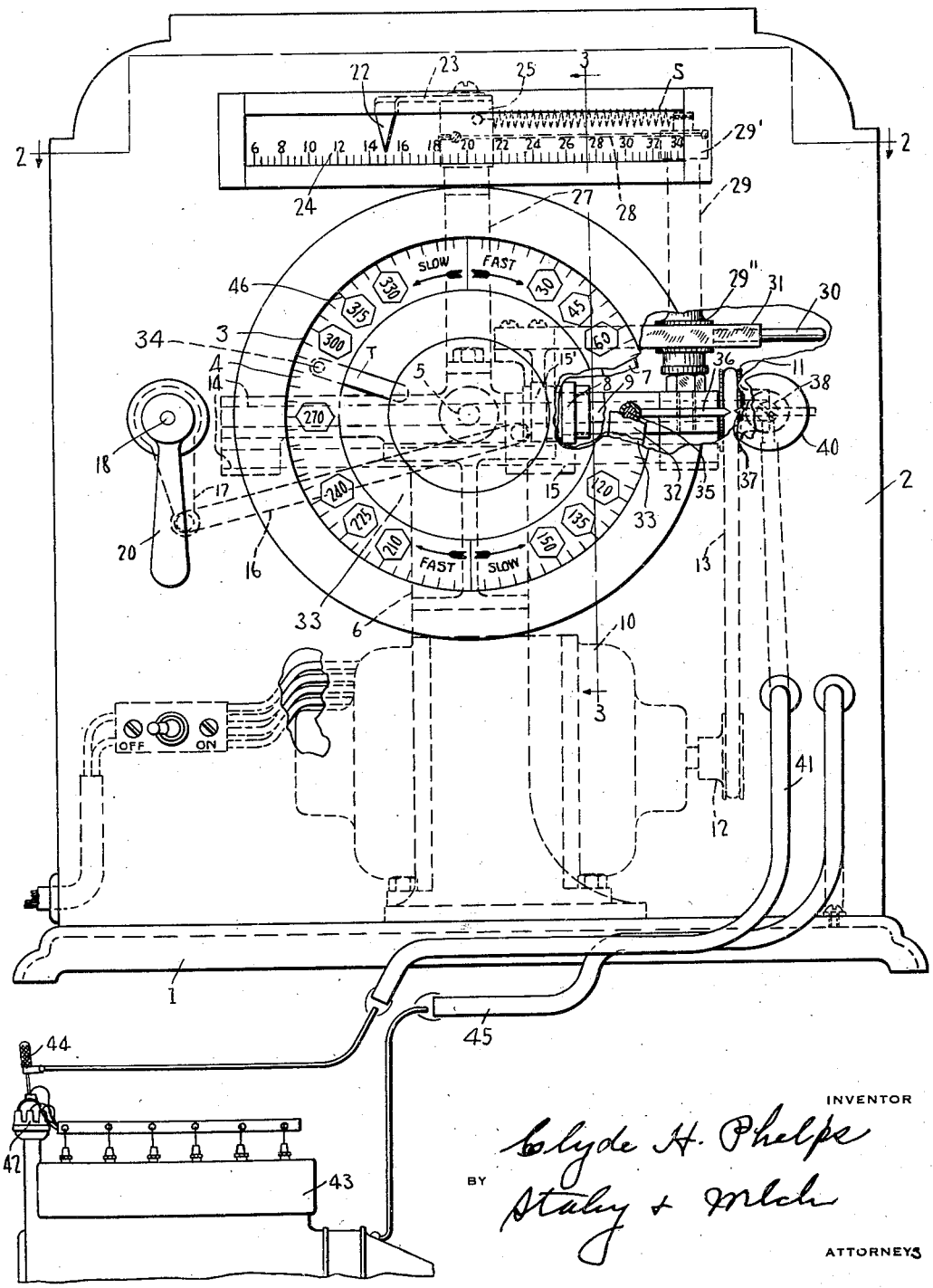
Fig. 1 is a front elevation of an apparatus embodying the improvements, some of the parts being shown in dotted lines and an internal six-cylinder combustion engine being shown conventionally.

The mechanism is mounted upon a base 1 and a front plate 2. The front plate 2 has an opening 3 closed by a glass plate 4 and back of this glass plate is a single light tube T, preferably a neon or other gas-filled tube such as a Crookes, which is mounted on a longitudinally disposed shaft 5 rotatably mounted in the upper portion of a bracket 6 which is carried by the base; the light tube being radially disposed with respect to the axis of rotation of the shaft. This shaft has fixed thereto a friction disk 7 which is driven by an adjustable friction pinion 8 which is keyed upon a shaft 9 so as to rotate therewith but being capable of an axial movement thereon. The shaft 9 is mounted for rotation in the bracket 6 and is driven from an electric motor 10 through the pulleys 11 and 12 and belt 13.

Means are provided for shifting the pinion 8 on the shaft 9 to vary the speed of the friction disk in order that the speed of rotation of the light tube may be synchronized with the speed of the motor being tested. Mounted upon two rods 14 carried by the bracket 6 is a shiftable head 15 which has a yoke-shaped portion 15' which fits in a groove 8' formed on the hub of the friction pinion. Pivotally connected to this head is one end of a link 16, the other end of the link being pivotally connected to a crank arm 17 fast to a rock shaft 18 which is journalled at its rear end in a bearing 19 extending from the bracket and at its forward end in the front plate 2, the rock shaft being preferably covered by a sleeve 20 and has secured thereto at its forward end an operating handle 21.

When the friction pinion is shifted to vary the speed a pointer 22 on the end of an arm 23 is moved over a circular calibrated scale 24 enclosed by a transparent window 24' which is exposed through the glass cover opening in the front plate 2. The arm which carries the pointer has a hub 25 which is pivotally mounted on a stud 26 carried by projecting portion 27 of the bracket. Connected to the hub of the arm is one end of a thin cable 28, the other end of the cable being connected to an enlargement 29' on the upper end of a vertical rod 29, the lower end of the rod having an enlargement 29" from which projects a pin 30. Secured to the yoke-shaped portion 15' of the shiftable member 15 is a comparatively stiff spring 31, the free end of which engages the pin 30, so that when the friction pinion 8 is shifted toward the outer periphery of the disk 7 the spring 31 will contact the pin 30 and rock the rod 29 so as to rotate the hub 25 of the arm 23 which carries the pointer 22. When the friction pinion is shifted toward the center of the disk 8 a coil spring S which has one end connected to the hub 25 of the pointer arm 23 and the other end connected to the enlargement 29' serves to move the pointer arm 23 in the opposite direction. The pointer cooperates with the graduations on the scale to indicate the speed of rotation of the engine in hundreds of revolutions.

While in operation the speed of the light tube is synchronized with the cam shaft of the engine, the scale is preferably calibrated to indicate the number of revolutions of the crank shaft of the engine.

In order to convey the electrical impulses from the ignition system of the internal combustion engine to the light tube there is secured to the shaft 5 a disk 33 of insulating material which has fast thereto a collector ring 32. The gas-filled tube T previously referred to is carried by this disk 33 and has one end thereof electrically connected with the collector ring 32 by the connection 34, the other end of the tube being grounded to the shaft 5. Cooperating with the collector ring is a brush 35 which has a fixed spark gap terminal 36 which cooperates with an adjustable spark gap terminal 37, this adjustable terminal being mounted on a rotatable pin 38 rotatably mounted in the front plate 2 and covered with a sleeve of insulating material 39. A knurled knob 40 is connected with this rotatable rod on the forward side of the front plate so that it may be rotated to adjust the distance between the terminals to obtain the brightest light in the light tube and also to enable the device to be used to test the proper gap between the terminals of the spark plugs of the engine.

A high tension lead 41 is connected with this rod 38 so that the rod may be placed in electrical communication with the central terminal of the cap of the distributor 42 of the internal combustion engine shown conventionally at 43 by inserting the metal point of the conductor 44 in and alongside of the distributor center wire, the metal point being pushed into the distributor cap as far as possible, and clipping the high tension lead to the conductors in order to make electrical contact at this point. A ground wire 45 is attached at one end to the base 2 and at its other end to any convenient point on the engine frame or other metal car part that is a part of the grounded system.

The electric motor which drives the light tube is operated from any suitable source of current supply and is a standard substantially constant speed motor.

In operation, the conductor cable of the motor 10 is connected to the current supply, the ground wire 45 is grounded in the manner described, and the high tension lead connected in the manner described to the distributor cap of the internal combustion engine in the way pointed out. The switch controlling the electric motor is then turned to the "on" position to start the motor and the automobile engine started in the usual manner and allowed to warm up to its normal running temperature. The speed control of the light tube is then adjusted until the speed indicator rests preferably at 1500 on the scale 24 and the point 37 of the spark length control is adjusted to obtain the brightest light. The carburetor of the internal combustion engine is then adjusted to increase its speed until there are as many streaks of light showing on the apparatus from the light tube as there are cylinders in the car, the carburetor adjustment being regulated until the light bands are moving slowly back and forth or slowly rotating in an anti-clockwise or left-hand direction.

In explanation of this, it will be understood that in a six-cylinder motor the light tube will preferably make one complete revolution for each firing of all of the cylinders so that an electrical impulse from the ignition system of the internal combustion engine will be imparted to the tube at each 60° of each revolution. In other words, in testing a six-cylinder engine preferably six equally spaced flashes will take place upon each complete revolution of the light tube about the axis of the shaft which carries it. The phenomenon that six bars or streaks of light will be visible to the observer is due to the fact that the tube is rotating so rapidly that it results in an optical illusion.

If the car motor is capable of holding an exactly uniform or constant speed the light bands may be made to remain practically at a standstill position. After the carburetor adjustment has been made and the light bands remain stationary or nearly so by proper synchronization of the speed of rotation of the light tube with the speed of the engine, so that there will be six bands flashing when working with a six-cylinder car, the operator will then proceed to make any adjustments in the internal combustion engine which he deems necessary, such for instance as cleaning or removing the spark plugs, or replacing the coil. Any adjustment made that causes the light bands to rotate to the right or clockwise shows an improved condition in the internal combustion engine, such as an increase in the speed with the throttle opening remaining constant. In the event that an increased speed has been imparted to the internal combustion engine by reason of some adjustment made therein and the streaks or bars of light consequently appear to be rotating in a clockwise direction, an adjustment will be made in the speed of rotation of the tube to slow down the light bands until they appear to be stationary or substantially so. This makes a consequent adjustment of the pointer 22 on the dial 24 to indicate the increase in motor speed or vice versa in case the motor speed has been decreased instead of increased.

On the back of the glass plate 4 there is pasted or otherwise secured a chart 46 which has degree indications thereon from 0 to 360 to indicate the correct firing position of four, six, eight, or greater cylinder engines. For instance, if the cam adjustment should be correct for a four-cylinder engine the light bands will be positioned at 90, 180, 270 and 360 degrees and for the more numerous cylinder engines the light bands will be positioned at the corresponding number of degrees. If the cam adjustment is incorrect this chart will show that defect.

By the arrangement shown and described for changing the speed of rotation of the light tube and indicating that speed, the movement of the indicator increases in direct proportion to the diameter of the disk 7; that is, as the friction pinion is moved from the outer periphery toward the center of the disk the speed of the indicating degree increases proportionately.

$$X \text{ equals } \frac{A}{1 \text{ plus tangent } B}$$

X equals R. P. M. on speed scale 24
A equals speed of friction disk 7
B equals angle (tangent) that pointer 22 makes with speed scale 24

At 45° of pointer 22 on speed scale 24 friction disk speed is 1750.

$$\frac{1750}{1 \text{ plus tangent } 45°} \text{ equals } 875$$

The apparatus not only indicates whether all of the cylinders of the engine being tested are firing, but also indicates the condition of the cam that operates the breaker points, for if the light bands are equally spaced the cam is in proper condition, but if the light bands are not equally spaced that indicates some defect in the cam. The electrical connection may also be made with any single spark plug to indicate the condition of that plug and to also indicate the speed of the motor with but one cylinder only firing.

The speed of rotation of the disk which carries the light tube is synchronized with the speed of the cam shaft and the scale with which the pointer cooperates is calibrated at crank shaft speed.

Having thus described my invention, I claim:

1. In an apparatus for measuring the frequency of interruptions of an electric current, a revoluble light tube, means for placing said tube in electrical connection with the current, a friction disk connected with said tube, a friction pinion cooperating with said disk, means for driving said pinion, means for shifting said pinion with relation to said disk to vary the speed of said disk, a speed indicating chart, a pointer movable over said chart, and means operated by said pinion shifting means to move said pointer over said chart.

2. In an apparatus for measuring the frequency of interruption of the ignition system of internal combustion engines, a revoluble light tube adapted to be rendered luminous by the passage of electric current therethrough, a friction disk connected with said tube, a friction pinion cooperating with said disk, means for driving said disk, means for shifting said pinion with relation to said disk to vary the speed of said disk, a collector ring revolubly connected to revolve with said friction disk and in electrical connection with said tube, means for placing said collector ring in electrical connection with the circuit of the ignition system, a speed indicating chart, a pointer cooperating with said chart, and means for moving said pointer over said chart operated by said pinion shifting means.

3. In an apparatus for measuring the frequency of interruptions of an electric current, a revoluble light tube rendered luminous by the passage of an electric current therethrough, means for revolving said tube, said tube being exposed at all points in the revolution thereof, means for placing said tube in electrical connection with the circuit to be measured including a pair of contact points, means to adjust the distance between said points, means to regulate the speed of revolution of said tube to synchronize it with the interruptions of said circuit, and means to indicate the speed of revolution of said tube.

4. In an apparatus for measuring the frequency of interruptions of the circuit of the ignition system of an internal combustion engine, a revoluble light tube adapted to be illuminated by the passage of the current of said system therethrough, means for revolving said tube, said tube being exposed at all points in the revolution thereof, means for placing said tube in electrical connection with the ignition system including a pair of contact points, means for adjusting the distance between said points, means to regulate the speed of revolution of said tube to synchronize it with the interruption of the circuit of said system, means to indicate the speed of revolution of said tube.

5. In an apparatus for measuring the frequency of interruptions of the circuit of the ignition system of an internal combustion engine, a revoluble light tube adapted to be illuminated by the passage of current of the system therethrough, means for placing said tube in electrical connection with the ignition system, means for revolving the tube about an axis at right angles to its own, means for varying the speed of said tube to synchronize it with the interruptions of the circuit of said system including a shiftable change of speed device, a speed indicating chart, a pivoted pointer movable over said chart, a rotatable shaft, a connection between said shaft and said pointer, a laterally extending pin on said shaft, a resilient arm connected with said shiftable change of speed member cooperating with said pin to move said pointer when said change of speed member is shifted in one direction, and a spring to move said pointer when said change of speed member is moved in the opposite direction.

CLYDE H. PHELPS.